(12) United States Patent
Choi et al.

(10) Patent No.: US 11,001,133 B2
(45) Date of Patent: May 11, 2021

(54) LINEAR POSITIONING SYSTEM FOR AUTOMATIC CHARGING DEVICE

(71) Applicant: ABB Schweiz AG, Baden (CH)

(72) Inventors: Sangeun Choi, Simsbury, CT (US);
Martin Krucinski, Glastonbury, CT (US); Harshang Shah, Bloomfield, CT (US); William J. Eakins, Coventry, CT (US); Stefan Rakuff, Windsor, CT (US); Gregory A. Cole, West Hartford, CT (US); Sree Shankar Satheesh Babu, Manchester, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/579,546

(22) Filed: Sep. 23, 2019

(65) Prior Publication Data

US 2021/0086601 A1   Mar. 25, 2021

(51) Int. Cl.
*B60K 1/04* (2019.01)
*B60L 50/51* (2019.01)
(Continued)

(52) U.S. Cl.
CPC ............. *B60K 1/04* (2013.01); *B60L 50/51* (2019.02); *B60L 50/64* (2019.02); *B60L 50/66* (2019.02); *B60L 53/11* (2019.02)

(58) Field of Classification Search
CPC .......... B60L 53/00; B60L 53/10; B60L 53/12; B60L 53/14
See application file for complete search history.

(56) References Cited

U.S. PATENT DOCUMENTS 5,654,621 A  *  8/1997  Seelig ................. H02J 7/025
                                                            320/108
5,703,461 A  *  12/1997  Minoshima .......... H01F 38/14
                                                            320/108
(Continued)

FOREIGN PATENT DOCUMENTS

CN   106114268 A   11/2016
CN   107458258 A   12/2017
(Continued)

OTHER PUBLICATIONS

European Patent Office, International Search Report in International Patent Application No. PCT/IB2020/058527, 5 pages (dated Dec. 17, 2020).

(Continued)

*Primary Examiner* — John D Walters
*Assistant Examiner* — James J Triggs
(74) *Attorney, Agent, or Firm* — Leydig, Voit & Mayer, Ltd.

(57) ABSTRACT

An automatic charging device and method is described that is positionable to access an underside of an electrical vehicle that facilitates hands-free connection of a vehicle-side electrical connector with a floor unit electrical connector. The automatic charging device includes a floor unit, a first slidable carriage disposed in the floor unit, a second slidable carriage disposed in the floor unit, a pivotal link coupled to the floor unit electrical connector, and a lift mechanism connected to the second slidable carriage and the pivotal link. The floor unit electrical connector is arranged to rise away from the floor unit in a direction of the vehicle-side electrical connector to facilitate a mating of the vehicle-side electrical connector and the floor unit electrical connector. The first and the second slidable carriages are configured to
(Continued)

move in a linear xy-direction, respectively, and the lift mechanism is configured to move in a linear z-direction.

20 Claims, 10 Drawing Sheets

(51) Int. Cl.
    *B60L 53/10*     (2019.01)
    *B60L 50/60*     (2019.01)
    *B60L 50/64*     (2019.01)

(56) References Cited

U.S. PATENT DOCUMENTS

| | | | | |
|---|---|---|---|---|
| 5,821,731 | A * | 10/1998 | Kuki | H02J 50/80 |
| | | | | 320/108 |
| 10,543,753 | B2 * | 1/2020 | Wechsler | B60L 53/38 |
| 10,604,024 | B2 * | 3/2020 | Nook | H02J 7/0029 |
| 2013/0249470 | A1 * | 9/2013 | Martin | B60L 11/182 |
| | | | | 320/107 |
| 2017/0080815 | A1 * | 3/2017 | Wechsler | H02J 50/10 |

FOREIGN PATENT DOCUMENTS

| | | |
|---|---|---|
| CN | 107745651 A | 3/2018 |
| CN | 107825976 A | 3/2018 |
| CN | 111071089 A | 4/2020 |
| EP | 0788212 A | 8/1997 |

OTHER PUBLICATIONS

European Patent Office, Written Opinion in International Patent Application No. PCT/I62020/058527, 7 pages (dated Dec. 17, 2020).

* cited by examiner

LINEAR POSITIONING SYSTEM FOR AUTOMATIC CHARGING DEVICE

TECHNICAL FIELD

The present disclosure relates to charging systems and methods for electric vehicles and, more particularly, to a connector for effecting a protective electrical connection between a vehicle charger and the vehicle in an automated linear motion.

BACKGROUND OF THE INVENTION

Use of electrical vehicles is becoming increasingly popular due to the environmental benefits of removing pollution caused by fossil fuel burning vehicle engines from the environment, especially in densely populated urban environments. As with most mobile electrical devices, electrical vehicles carry electrical power storage devices or batteries, which provide power to the vehicle propulsion and other systems. As can be appreciated, the vehicle batteries require periodic recharging to provide consistent vehicle operation.

At present, electric vehicle recharging is a time consuming process that is typically carried out over long periods, for example, overnight or during prolonged periods when the electric vehicle (EV) is parked. Power dispensers include flexible conduits or wire bundles that include a connector at their end, which plugs into a vehicle receptacle and then begins the transfer of power from the dispenser the vehicle's battery.

Traditional vehicle power dispensers operate at around 200-240 Volt AC, and transfer about 30 Amp of electrical power into a vehicle. As a consequence, providing a full charge to a vehicle can take up to 10 hours or more. With the increase in popularity of electric vehicles, faster charging solutions are required, especially for vehicles that operate for more than 12 hours per day such as emergency vehicles, public transportation, professional vehicles and the like.

With faster charging there is a need to isolate the user from the high voltages and high current of chargers by fast charging via the undercarriage of the EV with an automatic charging device (ACD) or the like.

Many ACD mechanism designs exist, but many fail to provide adequate protection against moisture, dust and debris ingress. The overall height of the ACD mechanism should be smaller than the EV ground clearance is another challenge to overcome. The ACD mechanism must also be resistant to accidental drive-over events. Finally, the ACD mechanism must lend itself to occupy only a minimum footprint when not in use.

BRIEF SUMMARY OF THE INVENTION

The invention provides an automatic charging device positionable to access an underside of an electrical vehicle (EV) that facilitates hands-free connection of a vehicle-side electrical connector with a floor unit electrical connector. The automatic charging device includes a floor unit having a perimeter, a first slidable carriage disposed in the floor unit, a second slidable carriage disposed in the floor unit, a pivotal link coupled to the floor unit electrical connector, and a pivotal lift mechanism connected to the second slidable carriage and the pivotal link. The floor unit electrical connector is arranged to rise away from the floor unit in a direction of the vehicle-side electrical connector to facilitate a mating of corresponding electrical contacts of the vehicle-side electrical connector and the floor unit electrical connector. The first and the second slidable carriages are configured to move in a linear xy-direction, respectively, and the pivotal lift mechanism is configured to move in a linear z-direction.

The invention also provides a flexible water-tight protective membrane disposed along the perimeter of the floor unit covering the first and second carriages with an opening configured to allow the floor unit electrical connector to protrude.

The invention further provides a hands-free method, carried out by an automatic charging device directed to an underside of an electrical vehicle (EV), for achieving an electrical connector mating between a vehicle-side electrical connector and a floor unit electrical connector of a floor-positioned recharging unit. The automatic charging device includes a first slidable carriage disposed in the floor unit, a second slidable carriage disposed in the floor unit, a pivotal link coupled to the floor unit electrical connection, and a pivotal lift mechanism connected to the second slidable carriage and the pivotal link. The method includes positioning vehicle-side electrical connector over the floor unit electrical connector, establishing a proper mating positioning of the connectors, and mate the positioned connectors to establish a functional electrical recharging path between the floor unit and the EV without physical user intervention.

The invention also provides that the second carriage includes a semi-rigid dome protective top cover configured to bear the weight of the EV during a non-operational position.

BRIEF DESCRIPTION OF THE SEVERAL VIEWS OF THE DRAWING(S)

DETAILED DESCRIPTION OF THE INVENTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
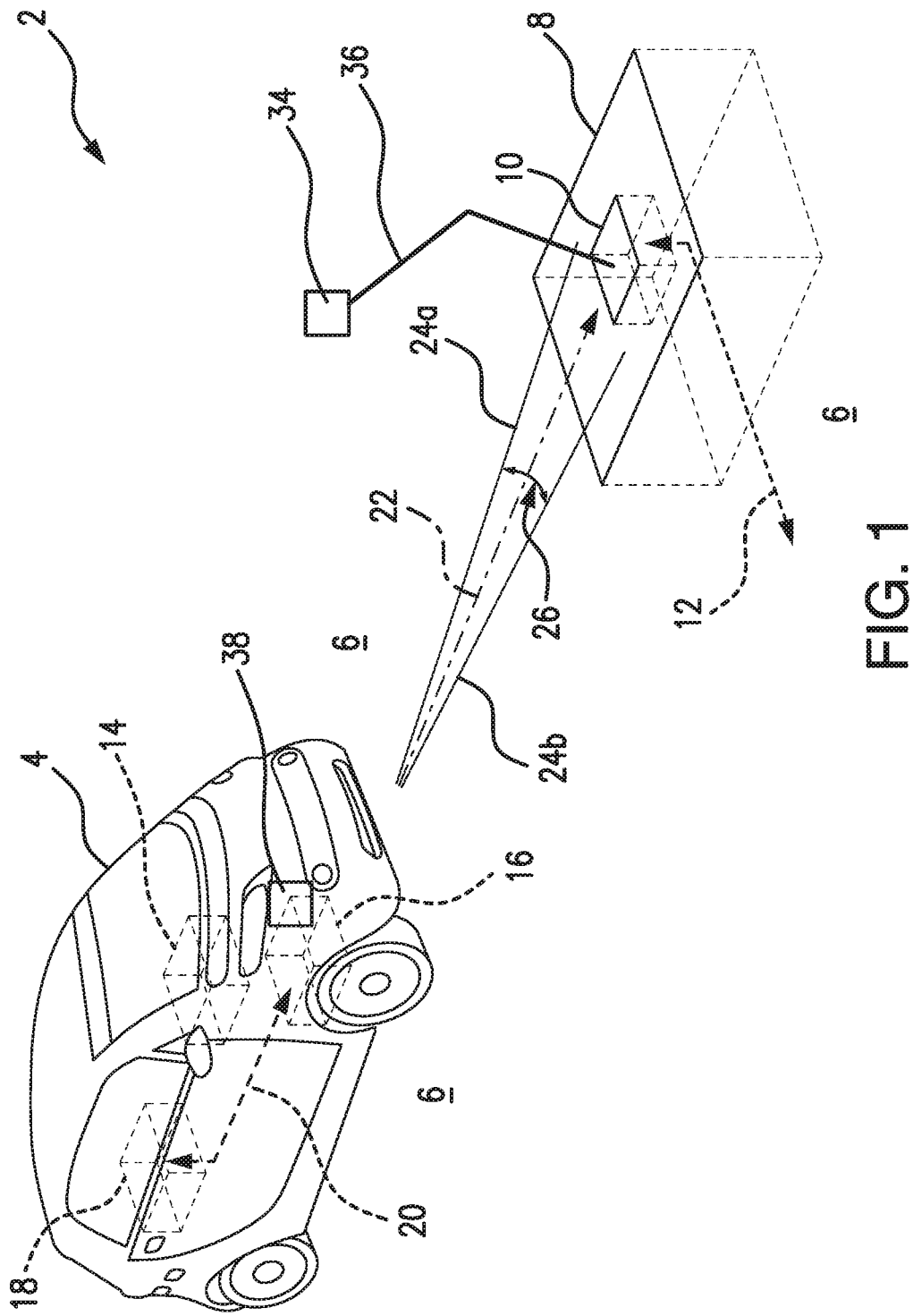
FIG. 1 is a perspective view of an electric vehicle (EV) charging environment according to an embodiment of the disclosure.

FIG. 1 is a perspective view of an electric vehicle (EV) charging environment 2 according to an embodiment of the disclosure. In the example shown in FIG. 1, an EV 4 is positioned on a ground surface 6. EV 4 is a car, as shown in FIG. 1. Alternatively, EV4 may be a truck, a motorcycle, a moped, a truck or bus, a farm implement or any other on- or off-highway vehicle. In the example shown, ground surface 6 is a floor of a garage of a home or business. Alternatively, ground surface 6 may be a surface of a parking lot. Environment 2 includes a floor unit 8. Floor unit 8 is positioned on or at least in part beneath ground surface 6. Depending on application, and also on the ground clearance of the vehicle, the floor unit 8 may be fully or partially disposed beneath the ground surface, or may alternatively be disposed on the ground surface, for example, when installed on existing floors. Floor unit 8 includes an automatic charging device (ACD) 10. At least a portion of ACD 10 faces and is exposed or exposable to ground surface 6. Floor unit 8 includes an ACD 10 that is operatively coupled to or associated with an electric power source (e.g., a utility grid, not shown in FIG. 1), either directly or through a transforming or conditioning device such as a transformer. A first electric power flow 12 can thus be selectively enabled between power source and floor unit 8, including to ACD 10.

EV 4 includes a drivetrain 14 providing motive power to the EV 4 for driving. EV 4 includes a vehicle unit 16 and at least one power storage device such as a battery 18. Battery 18 is operatively coupled to drivetrain 14 for providing electric power thereto to enable providing motive power for EV 4 selectively during operation. Structures and systems of the EV 4 that accomplish the provision of power to the drivetrain 14 selectively by an operator (now shown) of the EV 4 are omitted for simplicity. At least a portion of vehicle unit 16 faces and is exposed or exposable to ground surface 6. It is noted that, while the EV 4 is shown in one orientation as it approaches the floor unit 8, any orientation of approach is also contemplated. Vehicle unit 16 is operatively coupled to battery 18 to provide an interface for providing electrical power to charge the battery 18. A second electric power flow 20 is thus enabled between vehicle unit 16 and battery 18.

In the EV charging environment 2 shown in FIG. 1, EV 4 is being driven and approaches the floor unit 8 including ACD 10. A driver of EV 4 (e.g., a human driver and/or an autonomous vehicle driving system, not shown in FIG. 1) steers or otherwise controls the EV 4 to floor unit 8 including ACD 10 along a centerline path 22. As shown in FIG. 1, centerline path 22 extends from EV 4 to at least approximately a center point of ACD 10 proximal ground surface 6. Based on the particular dimensions and other specifications of EV 4, floor unit 8 including ACD 10, and/or vehicle unit 16, an approach path of EV 4 to floor unit 8 including ACD 10 may deviate from the target centerline path 22 by an allowable deviation 24. The allowable deviation may be in any direction, including but not limited to a horizontal or vertical direction. Allowable deviation 24 includes a driver side deviation 24a and a passenger side deviation 24b. An allowable misalignment 26 is defined between lines defining driver side deviation 24a and passenger side deviation 24b. In three dimensions, the misalignment 26 may form a conical area that accounts for height of ground clearance of the vehicle, as well pitch, yaw and roll of the vehicle's trajectory during the approach to the floor unit 8, and also during the connection and charging operations.

Figure 2:
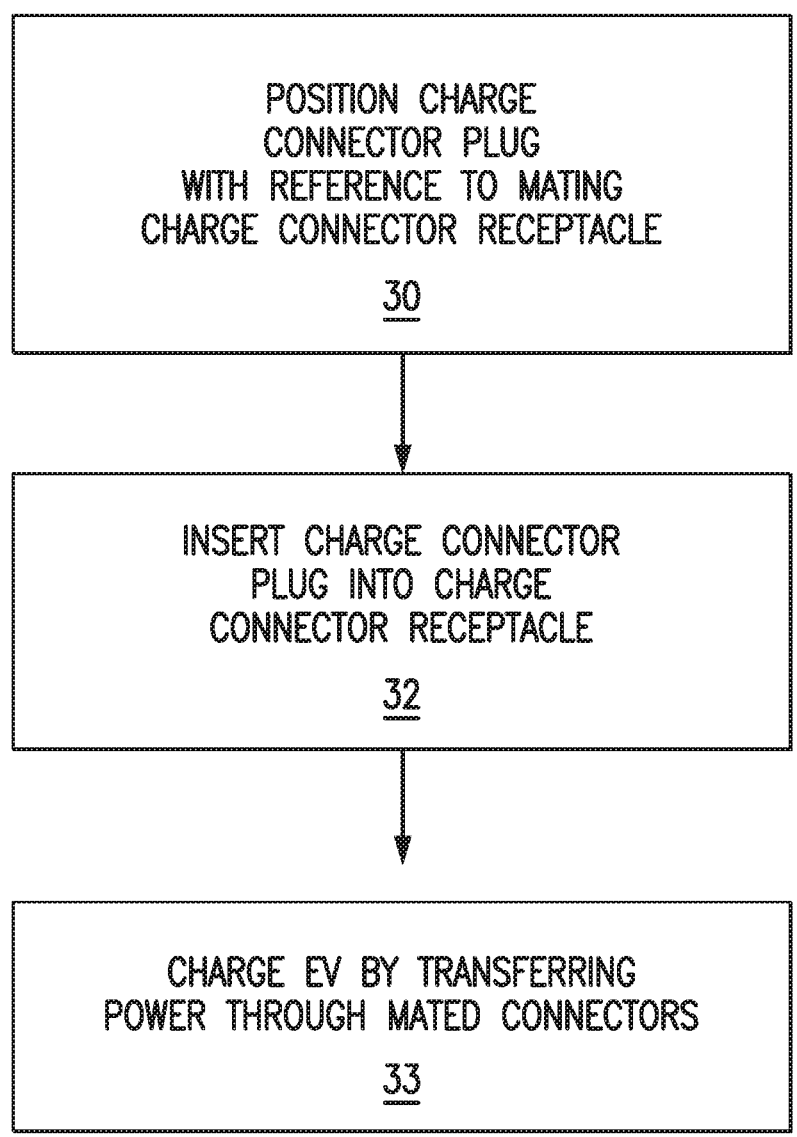
FIG. 2 is a flowchart of a method for underside charging of EVs according to an embodiment of the disclosure.

FIG. 2 is a flowchart of a method 28 for underside charging of the EV 4 according to an embodiment of the disclosure. In an example, method 28 is implemented and performed, at least in part, by a mechanical and/or electrical linkage system 36, which rises up from the floor 6 from the ACD 10 and includes or carries an electrical connector 34. The electrical connector 34 matingly engages a connector 38 associated with the vehicle unit 16 when the EV 4 is stationary over the floor unit 8 for charging. In some embodiments proximity sensors may be disposed in the mechanical and/or electrical linkage system 36 to detect the EV 4 and to align the connector 34 to the vehicle side electrical connector 38.

Referring to FIG. 2, method 28 includes positioning at 30 the connector 34 on the floor unit 8 with reference to connector 38 on the EV 4 using linkage 36. Such placement may be carried out automatically. Method 28 further includes inserting at 32 the connector 34 into connector 38, and initiating a charging process at 33. When the connectors 34 and 38 are mated, a flow of electrical power from the power flow 12 is allowed to be transmitted from the floor unit 8 to the vehicle unit 16, and from there to the battery 18 to charge the battery. A breakable electrical connection between the connectors 34 and 38 is included in this power flow path that charges the battery 18. As can be appreciated, the environment in which the connectors 34 and 38 is harsh because one or both sides of the connectors 34 and 38 are exposed to the environment, road debris, etc. Moreover, the connectors 34 and 38 are advantageously compact to enable or facilitate manual and/or automatic coupling for charging the battery 18.

Figure 3:
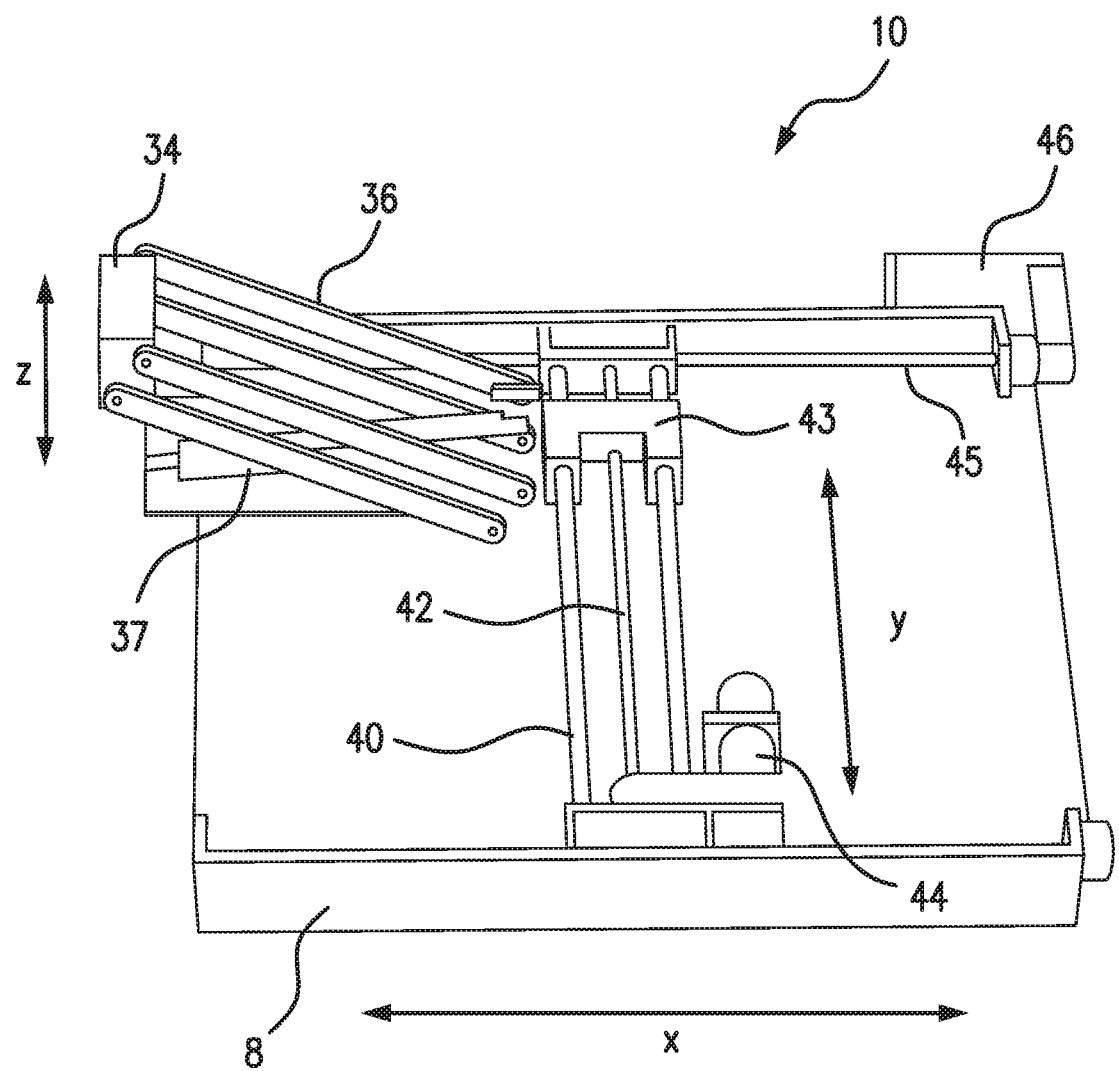
FIG. 3 is a perspective view of a positioning stage according to an embodiment of the disclosure.
Figure 4:
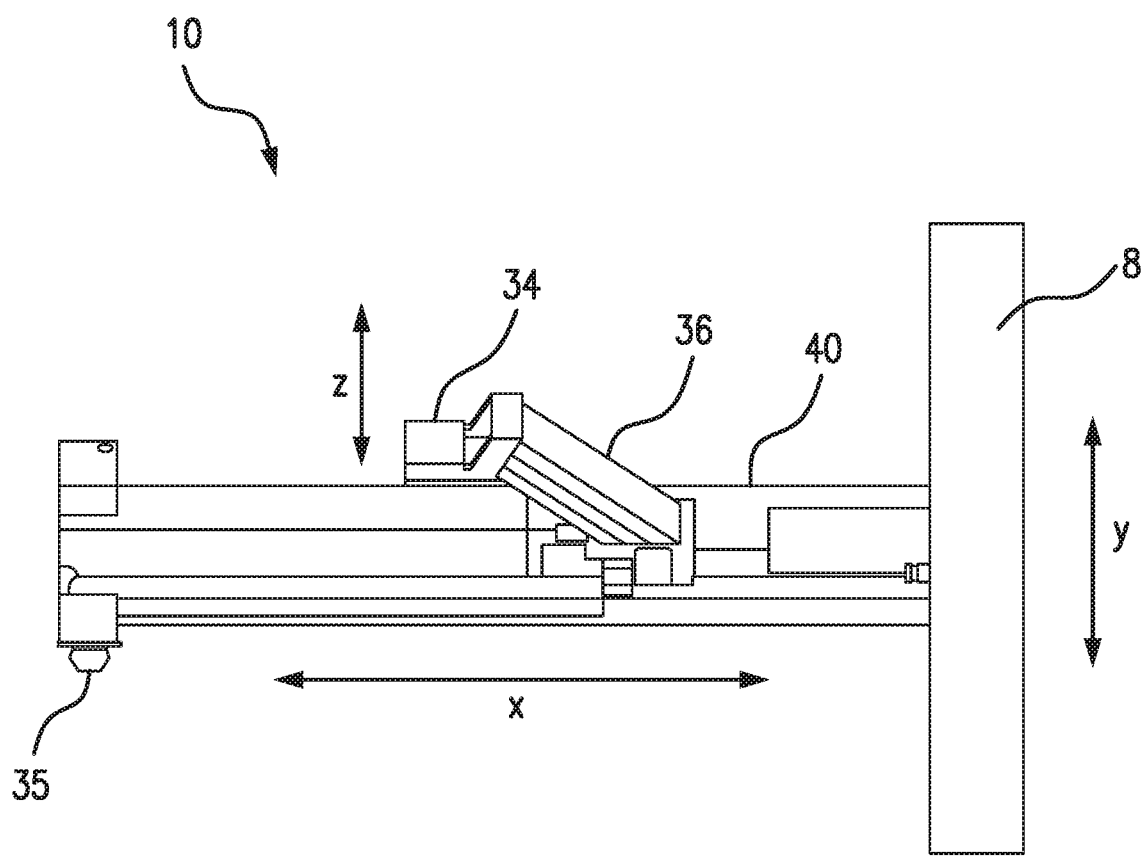
FIG. 4 is a diagrammatic view of a positioning stage according to an embodiment of the disclosure.

Referring to FIGS. 3 and 4, there is a positioning stage for an ACD 10 according to an embodiment of the disclosure. Some embodiments include an underbody charging for electrical vehicles (EV) with an ACD 10 that is floor mounted. This ACD 10 includes an x-axis carriage 40 at actuator 46 disposed within floor unit 8 and a y-axis carriage 43 having an actuator 44 also disposed within floor unit 8 in a low-profile series configuration (i.e., axes are not stacked), a third height adjustment mechanism at linkages 36 (z-axis) coupled to the y-axis carriage 43, a dome structure attached to the y-axis carriage 43 for driver-over and ingress protection, two electrically or mechanically coupled lead screws 42 and 45 used to move the y-axis guideway, a vertical compliance built into the z-axis lead screw, and spring loaded caster wheels 35 configured to provide compliance (drive-over or vertical connector compliance). Actuator 44 and actuator 46 are coupled to carriage 43 and carriages 40, respectively and include compliant, elastic coupling such that there is compliance in a physical positioning of carriages 43 and 40. The dome structure may be configured to protect carriage 43 by supporting the drive-over weight of the EV 4.

In certain embodiments, a controller of the ACD 10 may be configured to receive information from the proximity sensors and to determine a motion plan to connect to the EV 4. The controller may further be configured to collect operational and sensor data as a record of a connection event and metrics about whether or not the connection is a success.

In some embodiments, this collected data provides information to improve ACD 10 operation, learn patterns of the user to improve performance of the ACD 10 and this data may be used for improved design parameters of the ACD 10 either through design changes in the ACD 10 or operational improvements in the setup parameters or through modification of the control software (machine learning).

Some embodiments include an ultra-low profile ACD mechanism 10 to position the charge connector 34 and charge cable for automatic EV connection. The ACD mechanism 10 is configured to use x-axis and y-axis linear stages that are nested for a low profile height. A vertical height (z-axis) adjustment mechanism 37 is cantilevered off the y-axis carriage 43. In some embodiment, vertical height adjustment mechanism may be a lift cylinder such as a pneumatic cylinder.

The ACD mechanism 10 is configured to position the charge cable and connector for automatic connection with the EV underbody connector. The ACD mechanism 10 must be able to position the charge connector 34 to any given location within a virtual charging zone. The charging zone is a virtual box with a footprint of about 500 mm×500 mm in the x- and y-axis directions. The vertical (z-axis) range of the charging zone is about 90 mm to 260 mm. Angular positioning uncertainties include about a ±15° yaw angle.

The prior ACD mechanisms have a challenge that xy-stages need to cover the charging zone with combined axis motions occurring in pure x- or pure y-direction displacements. This can be a major challenge when a prior ACD mechanism is operated in force control in order to detect an x-direction or y-direction fiducial on the vehicle charge unit.

Challenges with typical xy-positioning stages or mechanisms that are designed to accomplish the 500 mm×500 mm range of motion is that they usually have stacked axes and exceed a 90 mm profile height by far. These off-the-shelf stages also are not capable of withstanding EV drive-overs and are not protected against water and dust ingress. Further requirements for the ACD mechanism 10 include robustness and low-coast (built from off-the-shelf commodity components). However, rather than stacking the y-axis on top of the x-axis carriage, the y-axis of the present invention is nested within the x-axis slideways. The result of this nesting is that the profile height of the ADC 10 is not a result of the sum of the profile heights of the x-axis and the y-axis. In some embodiments, the z-axis height adjustment mechanism 37 is cantilevered off the x-axis (or y-axis) carriage to reduce the overall profile height.

In certain embodiments, the x- and y-axis carriages 40 and 43 are guided with slideways or linear bearing with circulating steel balls. In some embodiments, the slideways employ lubrication free IGUS Drylin® linear slideways (linear bearings). Actuation of the carriages 40, 43 is accomplished with lead screws or ball screws at 42, 45 coupled to actuators 44, 46. Other means of carriage actuation include timing belts, chains, linear motors, hydraulic or pneumatic cylinders or the like. Timing belts may actually be preferred for packaging and cost reasons.

The friction surfaces of the slideways and lead screws at 45 are protected with rigid covers or shields at 8. The connecting link for the z-axis adjustment is configured with an inverted U-shape cross section at 34 (C-channel extrusion) to protect the lead screw and to minimize the profile height of the z-axis mechanism 37.

Figure 5:
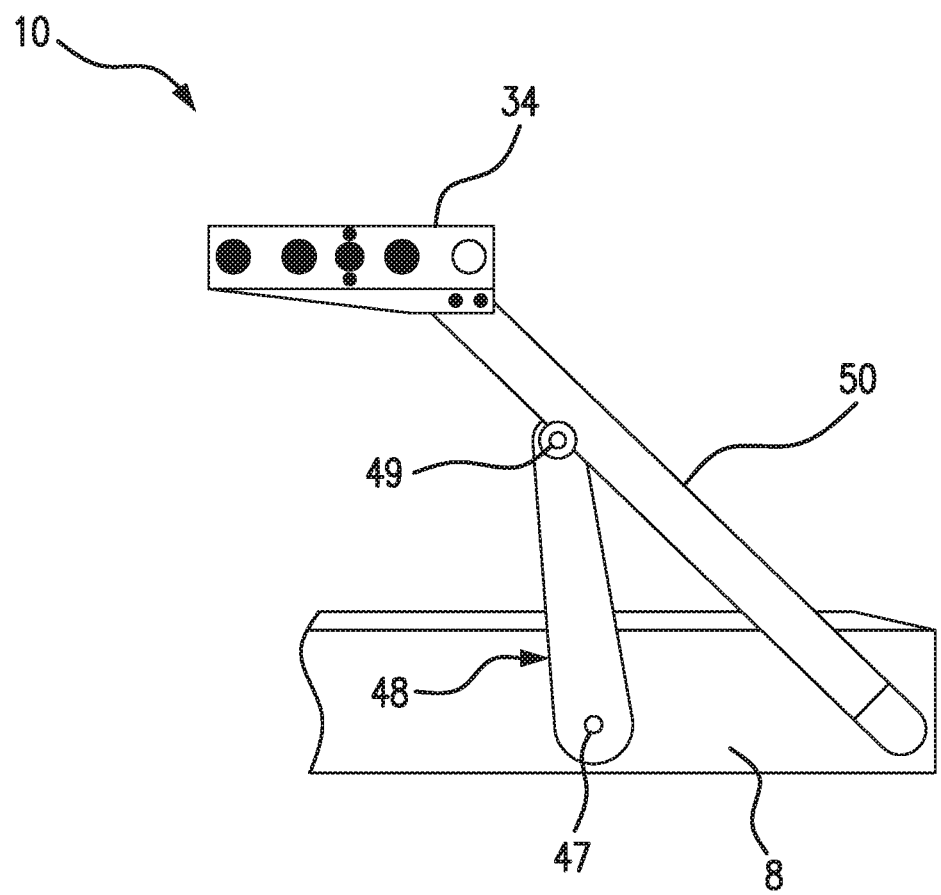
FIG. 5 is a side view of a rigid positioning stage and an engaged lift mechanism according to an embodiment of the disclosure.
Figure 6:
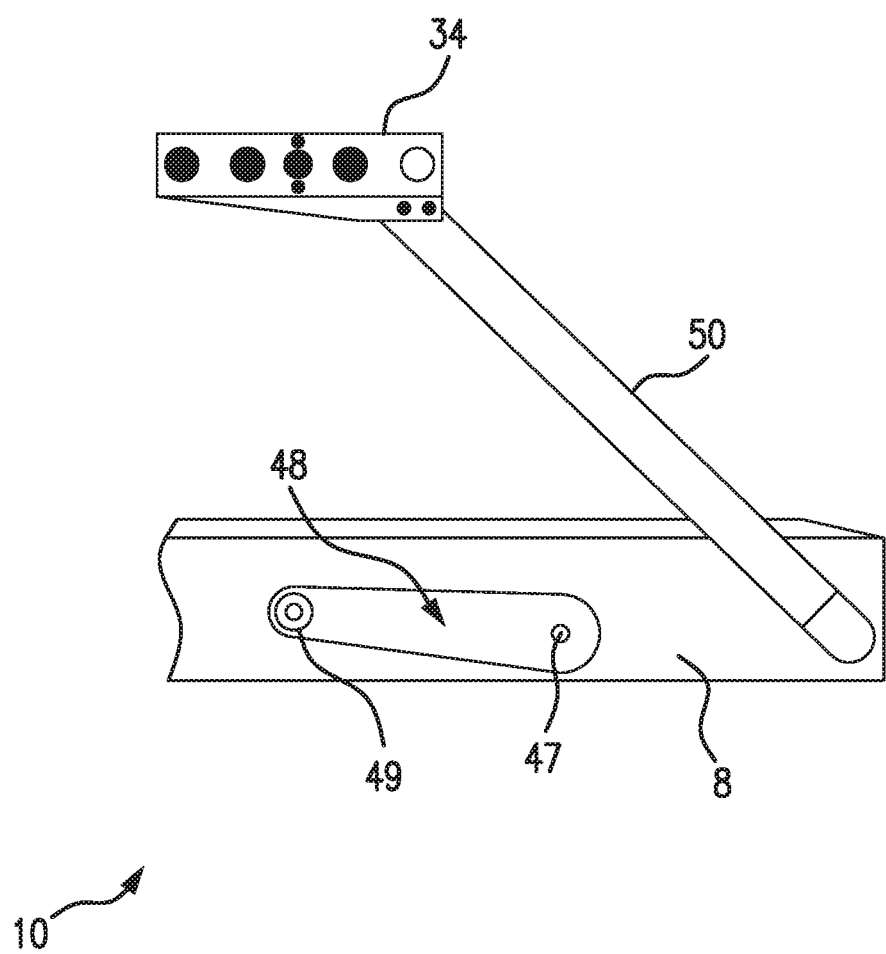
FIG. 6 is a side view of the rigid positioning stage and a disengaged lift mechanism according to an embodiment of the disclosure.

Referring to FIGS. 5 and 6, there is a rigid positioning stage at 50 and an engaged lift mechanism 48 according to an embodiment of the disclosure. When considering automatic connection systems for EVs 4, a positioner is required to place the electrical connection in the inlet, however, a positioner capable of this task is inherently fairly rigid and robust. Once connected, the EV 4 is prone to relatively high speed, though short motions, driving the need to build compliant mechanisms to accommodate vehicle motion when connected. Also, when considering the automatic mating cycle of an electrical connection using a mechatronic system it is essential to make accommodation for instances of harsh/sharp movement between the discrete components of the mated systems. Without such a solution to accommodate this relative movement it is possible that system damage could result (vehicle side, garage side, or both). During the mating sequence, the ACD 10 will actively work to monitor and maintain an accurate position relative to a charge inlet at 38. However, this positioning accuracy is no longer required once a mated connection is made between the charge inlet (pins) at 38 and the charge head (sleeves) at 34. Once connected, the positioning system need only serve as a flexible support path for the sake of electrical conductors along the path between the appliance origin and the charge head at 34.

A rigid or semi-rigid mechanism at 48 (mechatronic positioner) capable of positioning an electrical connector 34 which is coupled to an electrical connector connected to a compliant conductive pathway at 50 (cable wire with plug on end). An electrical receptacle at 38 capable of connecting to the plug head at 34 in the first element, capable of mechanical retaining plug head at 34 in connected state as required for connection. A system and method to de-couple rigid or semi-rigid positioning system from compliant connector to accommodate robust, damage-free movement of connected bodies (accommodation through compliant electrical pathway). The lifting arm 48 is designed for directional compliance with greater bending rigidity long the direction of lifting and greater compliance along the direction of plug insertion. Lifting arm 48 is configured to lift cable 50 in a z-axis direction above the floor 6 towards connector 38 when the EV 4 is present. This is achieved using sheet flexures 54 embedded within the walls of the cable 50 (See FIG. 7).

Referring again to FIGS. 5 and 6, in certain embodiments include a main body at 50 as the vertical lift element in a mechatronic positioning system, a revolute lifting arm 48 that is actuated about its base 8, a roller or slide contact 49 feature that temporarily couples the lift arm 48 to the main body at 50 during a lift sequence, a pivot element disposed at the base 8 of the main body at 50 configured to allow rotation and also accommodates a pathway of electrical connectors at 34, an attachment element disposed at the base 8 of the main body at 50 configured to mate with the pivot point 47 (revolute joint on preceding body in series chain), another attachment element configured to connect the main compliant body at 50 to the connection head 34 which may also provide some further compliant degrees of freedom about the axis of the main body, and an arrangement of rods or flexures 54 embedded within or otherwise along the path of the main body at 50 that are configured to influence the direction of compliance.

Certain embodiments include one main body at 50 (such as a cylindrical cable or other arrangement of conductors) that serves in one mode as the vertical lift link in an automatic connection positioning solution when acted upon by the positioning or lift arm 48. This lifting arm 48 is configured to rotate about its base 8 and acts upon the cable linkage at 50 via a roller 49 or other temporary contact. The relationship between the fixed pivot of the cable body and the contact point (at 49 in FIG. 5) with the rotating lift arm 48 is arranged so that rotational movement of the arm 48 translates the cable 50 and attached connection along a vertical path (z-axis). Once the charge head 34 is connected the lift arm 48 retracts (opposite rotation direction of lift) and the main body at 50 (cable) is now restored to its native mode as a naturally compliant body. In this mode the main body at 50 (cable) is merely a connected pathway between the vehicle inlet at 38 and the ACD 10. In one embodiment, though still relatively compliant, the shape of this compliance can be controlled by embedded features, such as rods or spring flexures that serve to affect the degree of compliance along a specific path. In other words, the internal elements could be arranged so that there is greater rigidity along the direction of life though the body remains compliant along the mating path of the connection head.

In certain embodiments, a component sub-assembly within a mechatronic positioning system at 10 that is meant to serve as a multi-mode compliant/rigid linkage as part of the kinematic chain described as an under vehicle electrical connector positioning system. The compliant/rigid linkage at 50 will serve as the final distal link that will ultimately translate the distance between a garage floor 6 (base) plane and the vehicle inlet plane (ceiling of VSU). A rigid or semi-rigid lifting body 48 is initially required in series with the other links of this positioning system at 10 for the purpose of accuracy but once the plug head 34 is positioned, lifted into place and secured to the VSU (mating pins), the rigid body 48 can now be released into a compliant state. This release will free up both the mechanical elements of the ACD 10 as well as the vehicle inlet components from motions such as the roll and pitch of the vehicle as it is exited/entered, loaded/unloaded and furthermore to unconstrain the positioning demands of the ACD 10.

Figure 7:
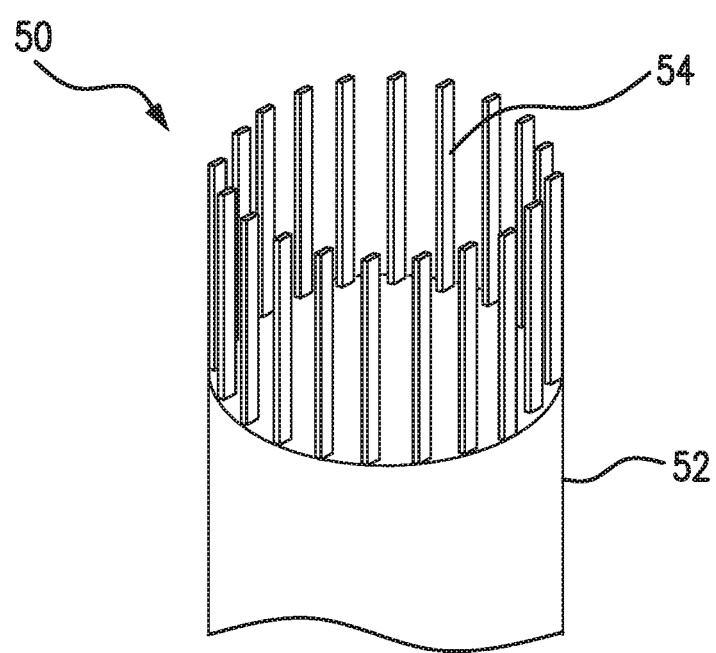
FIG. 7 is a perspective view illustrating a directional stiffness power cable including passive sheet flexures according to an embodiment of the disclosure.

Referring to FIG. 7, there is a directional stiffness power cable 50 including a sleeve 52 and passive sheet flexures 54 according to an embodiment of the disclosure. Presented is a system and method where in the positioning or lift mechanism at 48 is rigid or semi-rigid and loosely coupled to the electrical connection, such that during connection, once connector 34 is mechanically secured in the inlet at 38, the rigid portion detaches, leaving the plug connected to the EV 4 only through the highly compliant cable 50.

Figure 8B:
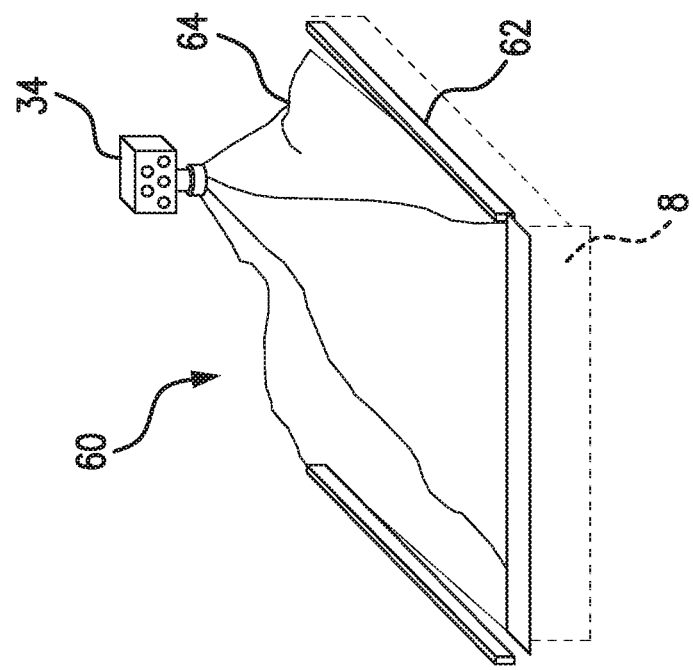
FIGS. 8A and 8B are diagrammatic views of another embodiment for a protection system against accumulation of debris within portions of a vehicle charging system, shown in two positions, in accordance with the disclosure.
Figure 8A:
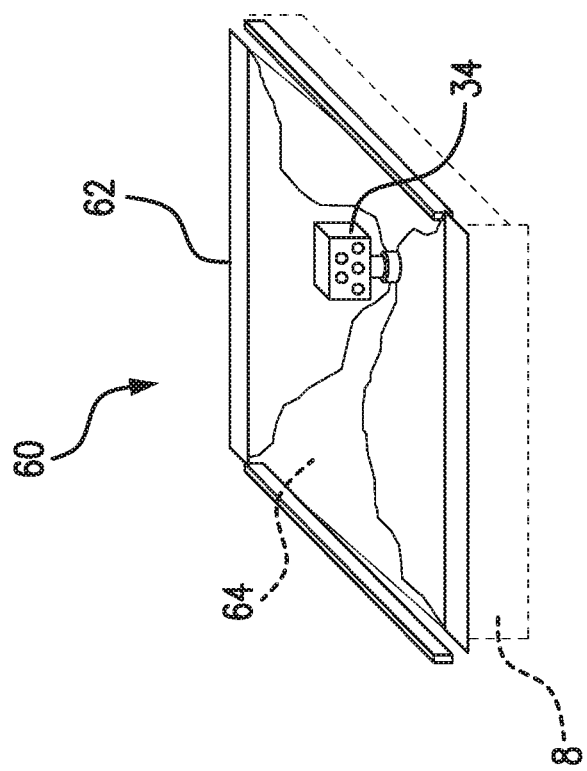

Referring to FIGS. 8A and 8B, there is an embodiment for a protection system 60 against accumulation of debris within portions of a vehicle charging system, shown in two positions, in accordance with the disclosure. In certain embodiments, there is a weather tight flexible membrane or jacket 64 configured to cover the ACD 10 thereby preventing contaminants from getting into the ACD 10. The jacket 64 provides an effective seal around the neck of the charging head 34 and the perimeter 62 of the ACD 10. FIG. 8A illustrates the protection system 60 at rest and FIG. 8B illustrates the protection system 60 in operation.

This ingress protection system 60 of the ACD 10 mechanism is achieved with a flexible membrane (jacket) 64 that is stretched over the entire outer frame 62 of the ACD 10 mechanism. The connector 34 platform is configured to poke out through an opening in the center of the flexible membrane 64.

Referring again to FIGS. 8A and 8B, in certain embodiments, a recess 9 in the floor unit 8 contains the linkage 36 and connector 34. The weather tight jacket 64 is connected along a perimeter 62 of the recess 9 and is also connected around the linkage 36 adjacent the connector 34. The jacket 64 thus flexibly encloses everything but the connector 34 to prevent contaminants from entering into the recess 9.

Figure 9:
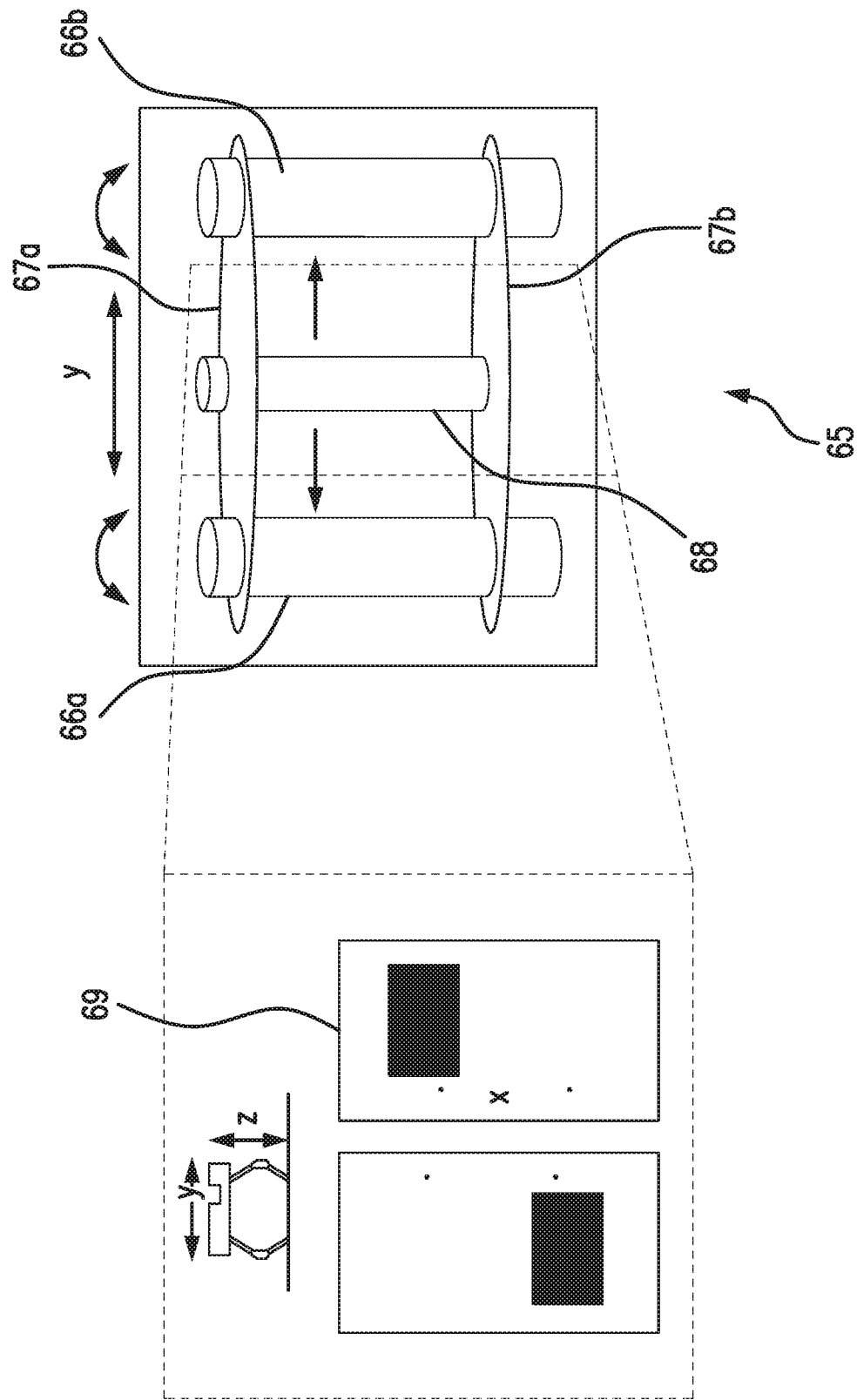
FIG. 9 is a schematic view of a linear positioning stage according to an alternative embodiment of the disclosure.

Referring to FIG. 9, there is an alternative embodiment of a linear xyz-positioning stage 65. In certain embodiments, the xyz-linear positioning stage 65 includes two rollers 66a, 66b that are connected by two belts 67a, 67b. Coupled to the belts 68a, 68b is a carriage 68 configured to move left and right (y-axis direction) when the rollers 66a, 66b turn. The y-axis carriage 68 contains a stage 69 of x-axis displacement and vertical (z-axis direction) adjustment of the connector platform 34.

Figure 10:
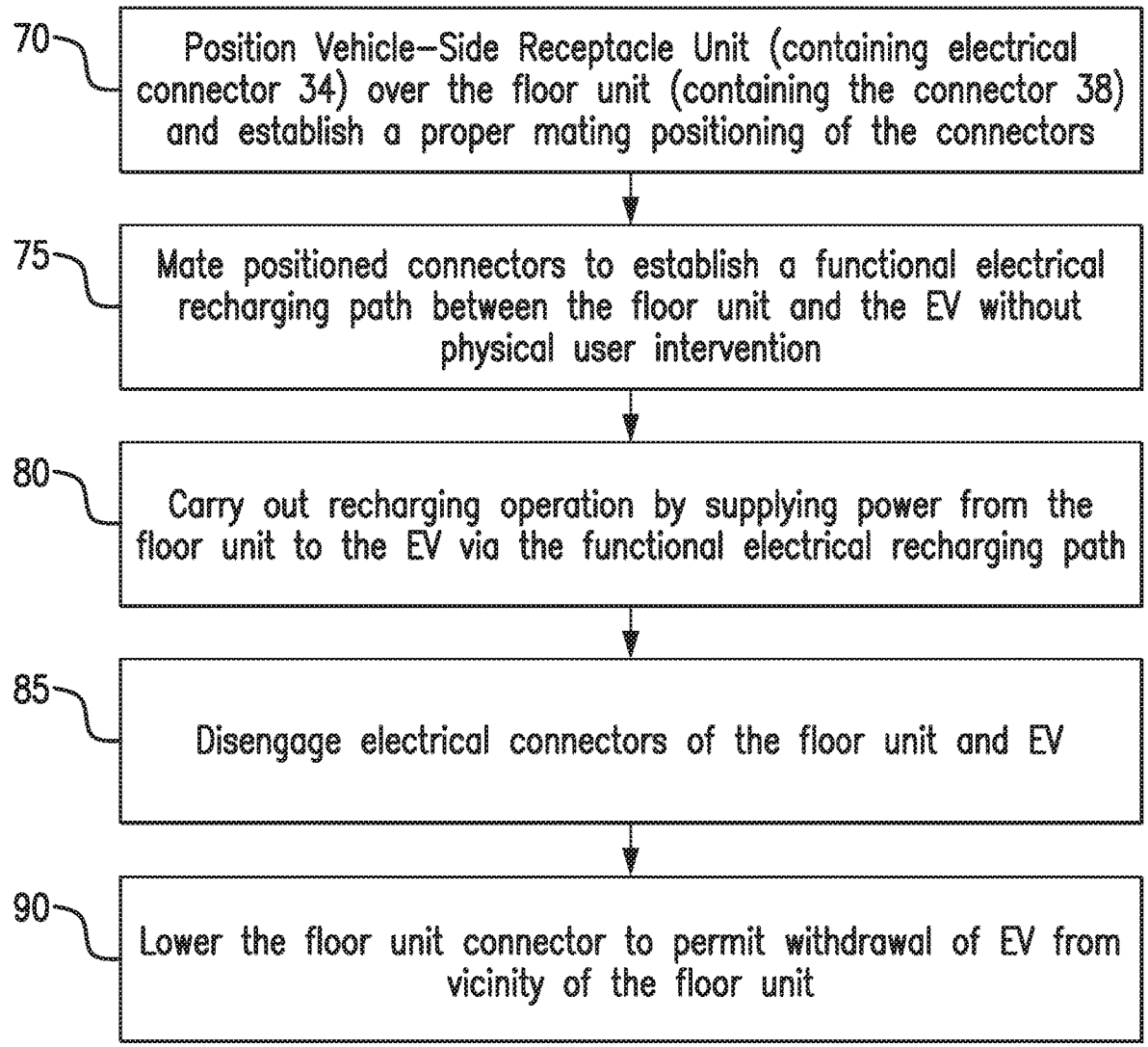
FIG. 10 is a flowchart of a method for recharging an EV containing a vehicle-side receptacle unit positioned on an underside of the EV according to an embodiment of the disclosure.

Referring to FIG. 10, a flowchart summarizes steps for a method for performing an underside recharging of the EV 4 according to an embodiment of the disclosure. In an illustrative example, the method is implemented and performed, at least in part, by the linkage system 36, which raises the electrical connector 34 from a retracted position near the floor level at 6 and cooperatively interacts with physical features/elements of the vehicle-side receptacle unit 16 to affect a physical mating of complementary connective structures of the electrical connector 34 (e.g., plug prongs) and corresponding electrically conductive surfaces (female receptacle electrodes) of the electrical connector 38 of the vehicle-side receptacle unit 16.

With continued reference to FIG. 10, referring to the particularly identified stages of a recharging operation carried out in accordance with the environment depicted in FIG. 1, during 70 the EV 4 is positioned over the floor unit 8 (within a range of acceptable relative positions) and the electrical connector 34 and linkage 36 are raised and guided such that the electrical connector 34 is placed in a mating position in relation to the electrical connector 38 of the EV 4.

After establishing a mating positioning of the electrical connector 34 in relation to the electrical connector 38, during 75 a mating is affected with regard to the complementary electrically conductive electrodes/surfaces of the connector 34 and the connector 38. By way of example, both the electrical connector 34 and the electrical connector 38 include corresponding flush/surface contacts. However, another suitable arrangement utilizes male/female prong/receptacle connectors. For example, the electrical connector 38 is a female/receptacle and the electrical connector 34 is a multi-pronged plug, and the mating of the connectors is achieved by inserting the prongs of the connector 34 into the receptacle openings of the connector 38. Alternatively, the electrical connector 34 comprises the female/receptacle and the electrical connector 38 comprises a multi-pronged plug. The positioning and mating of the electrical connector 34 with the electrical connector 38, as will be explained further herein below, is carried out without a user physically intervening.

After mating the connectors, during 80, power is supplied by the floor unit 8 to the vehicle-side receptacle unit 16 of the EV 4 to carry out a recharging operation of the battery 18. Thereafter, during 85, the electrical connector 34 and the electrical connector 38 are disengaged, and during 90 the connector 34 is lowered to permit withdrawal of the EV 4 from the vicinity of the floor unit 8.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An automatic charging device positionable to access an underside of an electrical vehicle (EV) that facilitates hands-free connection of a vehicle-side electrical connector with a floor unit electrical connector, the automatic charging device comprising:
    a floor unit having a perimeter;
    a first slidable carriage disposed in the floor unit;
    a second slidable carriage disposed in the floor unit;
    a pivotal link coupled to the floor unit electrical connector; and
    a lift mechanism connected to the second slidable carriage and the pivotal link,
    wherein the floor unit electrical connector is arranged to rise away from the floor unit in a direction of the vehicle-side electrical connector to facilitate a mating of corresponding electrical contacts of the vehicle-side electrical connector and the floor unit electrical connector.

2. The automatic charging device of claim 1, wherein the lift mechanism is a pneumatic cylinder.

3. The automatic charging device of claim 1, wherein the first and second slidable carriages include spring loaded casters.

4. The automatic charging device of claim 1, wherein the first and second slidable carriages are coplanar when in a non-operational position and when in an operational position.

5. The automatic charging device of claim 1, wherein the first and second slidable carriages are configured to move in the x-y planar directions via a first actuator and a second actuator, respectively.

6. The automatic charging device of claim 5, wherein the first actuator and the second actuator are coupled to the first and second slidable carriages via a compliant, elastic coupling such that there is compliance in a physical positioning of the first and second carriages.

7. The automatic charging device of claim 1, wherein the first and second actuators are lead screws coupled to a first linear motor and a second linear motor, respectively.

8. The automatic charging device of claim 1, wherein the first and second slidable carriages include proximity sensors to detect the EV and to align the floor unit electrical connector to the vehicle side electrical connector.

9. The automatic charging device of claim 7, wherein the proximity sensors are configured to align the floor unit electrical connector to the vehicle side electrical connector.

10. The automatic charging device of claim 9, further comprising a controller configured to receive and interpret information from the proximity sensors and configured to record information for calibration and post-operational analysis.

11. The automatic charging device of claim 10, wherein the controller is further configured to receive information from the proximity sensors and to determine a motion plan to connect to the EV.

12. The automatic charging device of claim 11, wherein the controller is further configured to collect operational and sensor data as a record of a connection event and to collect metrics whether the connection event is successful.

13. The automatic charging device of claim 12, wherein the collected data and metric are utilized by the controller to improve the automatic charging device operation by:
    learning patterns of an operator of the automatic charging device; and
    improving design parameters of the automatic charging device either through design changes in the automatic charging device or operational improvements in the setup parameters or through modification of the control software (machine learning).

14. The automatic charging device of claim 1, wherein the second carriage includes a semi-rigid dome protective top cover configured to bear the weight of the EV during a non-operational position.

15. An automatic charging device positionable to access an underside of an electrical vehicle (EV) that facilitates hands-free connection of a vehicle-side electrical connector with a floor unit electrical connector, the automatic charging device comprising:
    a floor unit having a perimeter;
    a first slidable carriage disposed in the floor unit;
    a second slidable carriage disposed in the floor unit;
    a pivotal link coupled to the floor unit electrical connector;
    a lift mechanism connected to the second slidable carriage and the pivotal link; and
    a flexible water-tight protective membrane disposed along the perimeter of the floor unit covering the first and second carriages with an opening configured to allow the floor unit electrical connector to protrude,
    wherein the floor unit electrical connector is arranged to rise away from the floor unit in a direction of the vehicle-side electrical connector to facilitate a mating of corresponding electrical contacts of the vehicle-side electrical connector and the floor unit electrical connector, and wherein the first and the second slidable carriages are configured to move in a linear xy-direction, respectively, and the pivotal lift mechanism is configured to move in a linear z-direction.

16. The automatic charging device of claim 1, wherein the first slidable carriage is an x-axis carriage guided by an x-axis slideway defined in the floor unit, and the second slidable carriage is a y-axis carriage guided by a y-axis slideway defined in the floor unit, and wherein the y-axis slideway is nested within the x-axis slideway.

17. The automatic charging device of claim 1, wherein the lift mechanism is configured to be retractible between a connection position, in which the floor unit electrical connector is has been raised and is mated with the vehicle-side electrical connector, to a rest position.

18. The automatic charging device of claim 1, wherein the lift mechanism is semi-rigid.

19. The automatic charging device of claim 1, wherein the lift mechanism is rigid.

20. The automatic charging device of claim 1, wherein the lift mechanism is rotatable about a base thereof.

\* \* \* \* \*